United States Patent [19]

Kyogoku

[11] Patent Number: 4,719,479
[45] Date of Patent: Jan. 12, 1988

[54] BUNDLED-TUBE FILTER FOR RECORDING APPARATUS

[75] Inventor: Hiroshi Kyogoku, Tokyo, Japan

[73] Assignee: Canon Kabushiki Kaisha, Tokyo, Japan

[21] Appl. No.: 894,501

[22] Filed: Aug. 5, 1986

Related U.S. Application Data

[63] Continuation of Ser. No. 600,396, Apr. 16, 1984, abandoned.

[30] Foreign Application Priority Data

Apr. 22, 1983 [JP] Japan ............................ 58-70998
Apr. 22, 1983 [JP] Japan ............................ 58-70999

[51] Int. Cl.$^4$ ............................................ G01D 15/16
[52] U.S. Cl. ............................ 346/140 R; 210/323.2; 210/510.1
[58] Field of Search ............. 346/140, 75; 210/510.1, 210/500.1, 323.2

[56] References Cited

U.S. PATENT DOCUMENTS

| 2,752,731 | 7/1956 | Altosaar . | |
|---|---|---|---|
| 3,832,579 | 8/1974 | Arndt | 346/140 X |
| 4,272,773 | 6/1981 | Halasz | 346/140 |
| 4,383,263 | 5/1983 | Ozawa | 346/140 |
| 4,419,677 | 12/1983 | Kasugayama | 346/140 |
| 4,429,320 | 1/1984 | Hattori | 346/140 |

OTHER PUBLICATIONS

Kendall et al.; Combined Nozzle and Filter Assembly and Its Fabrication, IBM TDB, vol. 22, No. 8A, Jan. 1980, pp. 3441–3442.

Primary Examiner—Joseph W. Hartary
Attorney, Agent, or Firm—Fitzpatrick, Cella Harper & Scinto

[57] ABSTRACT

A recording apparatus in which ink flows out from the end of a recording head to effect recording on a recording medium, has in a portion of an ink supply path leading from an ink container to the recording head a filter substantially parallel to the direction of liquid flow in the supply path and having a number of minute communication bores.

2 Claims, 6 Drawing Figures

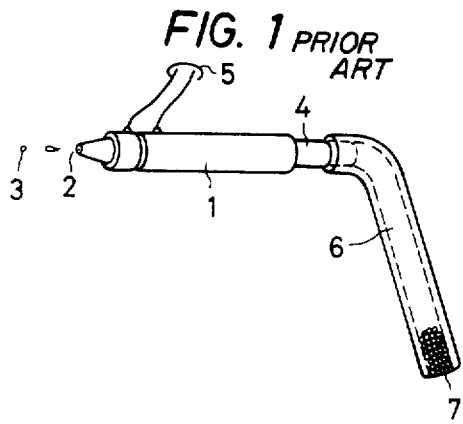
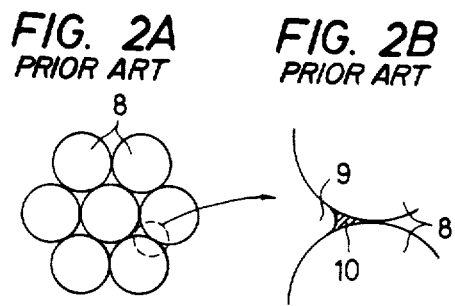
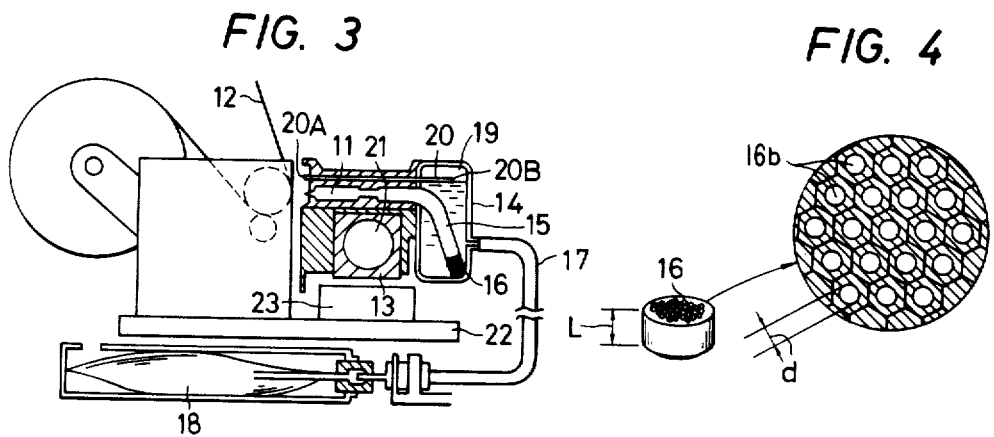
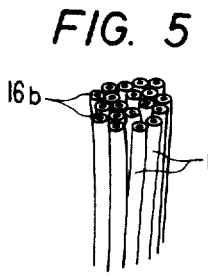

BUNDLED-TUBE FILTER FOR RECORDING APPARATUS

This application is a continuation of application Ser. No. 600,396 filed Apr. 16, 1984, now abandoned.

BACKGROUND OF THE INVENTION

1. Field of the Invention

This invention relates to a recording apparatus using ink to effect recording, such as a pen recorder or an ink jet recording apparatus, and to a liquid filter suitable for use with such a recording apparatus.

2. Description of the Prior Art

Generally, in a recording apparatus using ink to effect recording, such as a pen recorder or an ink jet recording apparatus, a filter is provided in the intermediate portion of an ink supply path for supplying ink from an ink container to a recording head. FIG. 1 of the accompanying drawings shows an ink jet recording apparatus according to the prior art. In FIG. 1, reference numeral 1 designates a cylindrical piezo element which may receive and compressively deform an electrical pulse and eject ink droplets 3 from an orifice 2. Reference numeral 4 designates a hard glass tube having the orifice 2 at the tip end thereof and further having the piezo element 1 wound thereon. Reference numeral 5 denotes a lead for transmitting the electrical pulse to the piezo element 1. One end of the lead 5 is connected to the surface electrode of the cylindrical piezo element 1 and the other end of the lead 5 is connected to an inner electrode through plating provided on the end surface of the element. Reference numeral 6 designates a flexible tube connected to an ink container, not shown, and also connected to the open end of the glass tube 4. Reference numeral 7 denotes a liquid filter forced into the tube 6. In the ink jet recording apparatus of the above-described construction, it is desirable that the filter 7 perform the following functions:

1. Block the entry of dust which can clog the nozzle whose opening diameter is several tens of μm;
2. Supply sufficient amount of ink to the nozzle;
3. Prevent bubbles created on the ink container side from entering the nozzle;
4. Prevent rearward escape of the pressure which provides the power when the piezo element 1 is deformed to fly ink droplets; and
5. Absorb any pressure fluctuations created in the nozzle and maintain the meniscus in the orifice in a stable condition when the recording head is mounted on a carriage and is reciprocally moved to right and left.

A particularly important function is preventing the entry of bubbles into the nozzle. If bubbles should enter the pressure chamber, which is a space in the glass tube surrounded by the piezo element, the efficiency of the piezo element 1 will be significantly decreased due to the great compressiveness of the bubbles. Also, if bubbles arrive at the vicinity of the orifice 2, the direction of flight of ink droplets will change or minute droplets will be created and cause unsatisfactory printing and, in the worst case, jetting of ink will become impossible.

Accordingly, preventing the entry of bubbles into the pressure chamber is indispensable for stable operation of the ink jet recording apparatus.

In contrast, the filter 7 heretofore used comprises particles 8 of polyethylene integrally shaped by sintering as shown in FIGS. 2A and 2B of the accompanying drawings, and suffers from various problems.

First, since this filter comprises hardened small particles, some of the particles may fall off when the filter is mounted. This means that the filter for preventing the entry of dust itself becomes a source of particles that can clog the recording head and thus, the manufacturing process used to make the filters must be strictly controlled.

Also, ink 9 tries to fill the spaces between the particles 8 but, an acute-angle portion 10 of 30° or less is unavoidably created between the particles and ink cannot enter such portion. If such an acute-angle portion 10 is present, it means that the filter for preventing the entry of bubbles itself contains bubbles therein. Such bubbles usually cannot be removed even if they are sucked from outside and, as the recording apparatus is used for many years, they are gradually discharged and enter the orifice.

SUMMARY OF THE INVENTION

It is an object of the present invention to solve the above-noted problems at a stroke.

That is, it is an object of the present invention to provide a recording apparatus which can accomplish very stable recording without creating any bubbles which may adversely affect recording and without the possibility of a part of the liquid filter coming loose to clog the recording head, and a liquid filter suitable for use with the recording apparatus.

It is also an object of the present invention to provide a recording apparatus in which ink flows out from the end of a recording head to effect recording on a recording medium and in a portion of an ink supply path leading from an ink container to the recording head, there is provided a filter substantially parallel to the direction of liquid flow in the supply path and having a number of minute communication bores.

It is a further object of the present invention to provide a lotus root-like or honeycomb-like liquid filter mounted in the intermediate portion of the ink supply path and substantially parallel to the direction of liquid flow in the supply path and having a number of minute communication bores.

The invention will become fully apparent from the following detailed description thereof taken in conjunction with the accompanying drawings.

BRIEF DESCRIPTION OF THE DRAWINGS

FIG. 1 is a perspective view of a recording head according to the prior art.

FIGS. 2A and 2B are enlarged views of a filter.

FIG. 3 is a cross-sectional view of an ink jet recording apparatus according to an embodiment of the present invention.

FIG. 4 illustrates a filter used in the embodiment.

FIG. 5 illustrates the manufacturing process of the filter of FIG. 4.

DESCRIPTION OF THE PREFERRED EMBODIMENT

FIG. 3 shows an ink jet recording apparatus according to an embodiment of the present invention.

In FIG. 3, reference numeral 11 designates a recording head for discharging ink by the action of a piezo element to effect recording by ink similarly to the recording head shown in FIG. 1, reference numeral 12 denotes recording paper on which recording by ink is effected, reference numeral 13 designates a carriage for reciprocating the recording head, reference numeral 14 denotes a sub-ink tank for supplying ink to the recording head, reference numeral 15 designates a supply pipe for supplying ink from the sub-ink tank 14 to the recording head, and reference numeral 16 denotes a filter for cutting dust, bubbles, pressure, etc.

The recording head 11 and the sub-ink tank 14 for supplying ink to the recording head are integrally provided on the reciprocally movable carriage 13. The sub-ink tank 14 is connected to a main ink tank 18 by a reciprocally movable ink supply tube 17. Any fluctuation of pressure caused by the inertia of the ink in the ink supply tube 17 vibrated by reciprocal movement of the carriage 13 is absorbed by the air layer 19 and the filter 16 in the sub-ink tank 14.

However, if the air layer 19 in the sub-ink tank 14 becomes pressurized by temperature rise or ambient pressure reduction, the pressure of the air layer will be propagated to the recording head 11 and normal discharge of ink will become impossible.

Therefore, the main ink tank 18 is formed into a flat and thin type flexible bag structure so as to absorb any variation in pressure caused by the air layer 19 in the sub-ink tank 14. That is, the ink jet recording apparatus of the type receiving the supply of ink from the fixed main ink tank 18 through the movable supply tube 17 and effecting recording by reciprocally moving on the carriage at a high speed requires a sub-ink tank having therein an air layer for absorbing any momentary pressure fluctuation caused by the inertia of the ink in the supply tube 17 and further requires the absorption of the relatively slow pressure fluctuation caused by the air layer being expanded by the temperature rise or the like in the apparatus.

The load resistance of the recording head 11 and the filter 16 is much greater than the load of the supply tube 17 and the main ink tank 18 of the flat and thin type flexible bag structure and therefore, the ink in the sub-ink tank 14 readily moves into the main ink tank 18, whereby the pressure in the sub-ink tank 14 becomes balanced. The diameter of the discharge orifice of the recording head is usually 100 $\mu$m or less.

The absorbing effect of the momentary pressure fluctuation is greater as the air layer 19 in the sub-ink tank 14 becomes greater in quantity. On the other hand, however, the secondary effect of the air layer being expanded or contracted by a temperature change becomes greater and the air layer usually has a volume of the order of 0.3 to 0.8 cc.

However, even in such a construction, if air bubbles lie sporadically in the ink supply tube 7, ink will not move smoothly. To eliminate such inconvenience, in the present embodiment, a communication opening to the atmosphere is provided in the sub-ink tank 14 by a thin tube 20 having a small inside diameter. Accordingly, this structure forms not a completely sealed system but a quasi-sealed system. The outer end 20A of the thin tube 20 is utilized to initially fill the sub-ink tank 14, and the level of the ink in the sub-ink tank 14 reaches the inner end 20B of the thin tube 20 and the interior of the tube is also filled with ink.

The ink is exclusively for use for ink jet and the components thereof include a solvent such as polyethylene glycol which is very hard to evaporate and therefore, the ink in the thin tube 20 does not completely evaporate throughout a long period of time and by the surface tension and viscosity thereof, it cuts off the communication between the air layer 19 in the sub-ink tank 14 and the atmosphere to thereby form a quasi-sealed system.

Reference numeral 21 designates the magnetic yoke of a linear motor which serves also as a sliding shaft, reference numeral 22 denotes a frame and magnetic yoke, and reference numeral 23 designates a permanent magnet. The carriage 13 is reciprocally moved to right and left on the magnetic yoke 21 by the Fleming's force acting between it and a coil, not shown.

The supply of ink from the main ink tank 18 to the recording head 11 is automatically accomplished by the ink being sucked from the main ink tank 18 due to the air layer 19 in the sub-ink tank 14 being reduced in pressure by the decrease in the ink in the sub-ink tank 14 caused by the continuous surface tension or capillary phenomenon of the ink or injection of the ink.

The filter 16 has a structure like a lotus root or honeycomb in cross-section, as shown in FIG. 4. This filter 16 is provided by bundling several hundred glass fiber tubes 6a each having a communication bore 6b having a diameter d of the order of 10–50 $\mu$m, as shown in FIG. 5, heat-compressing the bundle to eliminate the gaps between the fiber tubes and make the fiber tubes into the form of a lotus root or honeycomb, and cutting the honeycomb-like member into a suitable length by a cutter. This filter 16 has 20–800 communication bores per 1 mm$^2$, and it is preferable in effectively performing the function as a liquid filter that the relation between the length L and the diameter d of each communication bore be L/d $\geq$ 10.

Since, as described above, the filter 16 is of a construction in which a number of fiber tubes 6a having minute communication bores 6b have been heat-compressed so as to eliminate the gaps therebetween, it achieves well the function as a filter used in an ink jet recording apparatus, and parts do not separate and create loose particles as has been experienced in the prior art, and it does not have minute gaps having an acute angle of 30° or less which will hold bubbles therein.

The present invention is not restricted to the above-described embodiment, but ceramics having a stronger hydrophilic property may be used as the material of the fiber tubes, for example. Also, the fiber tubes need not always be of a circular cylindrical shape but may be, for example, of a square pillar shape or the like and in this latter case, it is preferable that the length of the largest side of the communication bores of the square pillar-like tubes be of the order of 20–50 $\mu$m. This filter may be used anywhere in the ink supply path leading from the ink tank to the recording head. Further, the above-described filter is widely applicable not only to an ink jet recording apparatus but also, for example, to a pen recorder or other recording apparatus for effecting recording by the use of ink.

According to the present invention, as described above, very stable recording becomes possible without creating bubbles which will adversely affect the recording and without the possibility of a part of the apparatus separating and clogging the recording head.

What I claim is:

1. A recording apparatus in which ink can flow from the end of a recording head to effect recording on a recording medium, comprising an ink supply path leading from an ink container to the recording head, and a filter disposed in said supply path and having a number of minute communication bores extending linearly and substantially parallel to the direction of liquid flow in said supply path, said bores being formed by a number of tubes of a ceramic material having hydrophilic properties bundled and integrally shaped in cross-section into the form of a honeycomb substantially without spaces between said tubes, wherein the diameter d of each of said communication bores of said filter is 10–50 μm, the number of communication bores per 1 mm² is 20–800 and the ratio of the length L of each of said communication bores to the diameter d of each of said communication bores is at least 10.

2. A recording device comprising a recording head, an ink supply path and a filter, wherein:

said recording head is adapted to effect recording on a recording medium with ink supplied through said ink supply path from an ink container to said recording head; and said filter is disposed in said supply path and has a number of minute communication bores extending linearly and substantially parallel to the direction of liquid flow in said supply path, said bores being formed by a number of tubes of a ceramic material having hydrophilic properties bundled and integrally shaped in cross-section into the form of a honeycomb substantially without spaces between said tubes, the diameter d of each of said communication bores of said filter being 10–50 μm, the number of communication bores per 1 mm² being 20–800 and the ratio of the length L of each of said communication bores to the diameter d of each of said communication bores being at least 10.

* * * * *

UNITED STATES PATENT AND TRADEMARK OFFICE
CERTIFICATE OF CORRECTION

PATENT NO. : 4,719,479

DATED : January 12, 1988

INVENTOR(S) : HIROSHI KYOGOKU

It is certified that error appears in the above-identified patent and that said Letters Patent is hereby corrected as shown below:

<u>COLUMN 4</u>

Line 18, "6a" should read --16a--.
    Line 18, "6b" should read --16b--.
    Line 30, "6a" should read --16a--.
    Line 31, "6b" should read --16b--.

Signed and Sealed this

Fourteenth Day of June, 1988

Attest:

DONALD J. QUIGG

*Attesting Officer*       *Commissioner of Patents and Trademarks*